US008706895B2

(12) United States Patent
Zany et al.

(10) Patent No.: US 8,706,895 B2
(45) Date of Patent: Apr. 22, 2014

(54) DETERMINATION OF QUALITY OF A CONSUMER'S EXPERIENCE OF STREAMING MEDIA

(75) Inventors: Sebastien Marc Peter Zany, Scottsdale, AZ (US); Joe Pei-Wen Hsy, Menlo Park, CA (US); Pierre Larose, St-Basile-le-Grand (CA)

(73) Assignee: BMC Software, Inc., Houston, TX (US)

( * ) Notice: Subject to any disclaimer, the term of this patent is extended or adjusted under 35 U.S.C. 154(b) by 23 days.

(21) Appl. No.: 13/174,725

(22) Filed: Jun. 30, 2011

(65) Prior Publication Data

US 2012/0144055 A1    Jun. 7, 2012

Related U.S. Application Data

(60) Provisional application No. 61/420,693, filed on Dec. 7, 2010, provisional application No. 61/440,349, filed on Feb. 7, 2011.

(51) Int. Cl.
| G06F 15/16 | (2006.01) |
| H04L 12/26 | (2006.01) |
| H04L 29/08 | (2006.01) |
| G06F 11/34 | (2006.01) |

(52) U.S. Cl.
CPC ............ H04L 43/0858 (2013.01); H04L 43/04 (2013.01); H04L 67/36 (2013.01); G06F 11/3423 (2013.01)
USPC ......................................................... 709/231

(58) Field of Classification Search
CPC ..... H04L 43/0858; H04L 43/04; H04L 67/26; G06F 11/3423
USPC .......................................................... 709/231
See application file for complete search history.

(56) References Cited

U.S. PATENT DOCUMENTS

| 6,195,680 | B1* | 2/2001 | Goldszmidt et al. .......... 709/203 |
| 6,904,094 | B1* | 6/2005 | Liu et al. .................. 375/240.13 |
| 2003/0187662 | A1* | 10/2003 | Wilson .......................... 704/500 |
| 2005/0097445 | A1* | 5/2005 | Day et al. .................... 715/501.1 |
| 2008/0155627 | A1* | 6/2008 | O'Connor et al. ............ 725/109 |
| 2009/0288129 | A1* | 11/2009 | Wolfe et al. .................... 725/116 |

OTHER PUBLICATIONS

"Making Sense of the Legendre Transform" (Zia, Redish, McKay, Sep. 2, 2007).*
iPhone iOS 3.1 User's Guide (Apple Inc., Sep. 9, 2009).*
"Streaming Video Over Variable Bit-Rate Wireless Channels" (Stockhammer, Jenkac, Kuhn, IEEE Transactions on Multimedia, vol. 6, No. 2, Apr. 2004).*

* cited by examiner

*Primary Examiner* — Benjamin R Bruckart
*Assistant Examiner* — Nicholas Celani
(74) *Attorney, Agent, or Firm* — Brake Hughes Bellermann LLP

(57) ABSTRACT

A bit stream analyzer may detect a bitstream representing a streamed content file that is being streamed from a streaming server to a client over a network connection. An encoding rate extractor may determine an encoding rate of the bitstream, and a bit rate extractor may determine a transfer bit rate at which the bitstream is being streamed. A pause calculator may determine a minimum wait time experienced at the client during which playback of the streamed content file is paused, based on the encoding rate and the transfer bit rate.

17 Claims, 9 Drawing Sheets

DETERMINATION OF QUALITY OF A CONSUMER'S EXPERIENCE OF STREAMING MEDIA

CROSS-REFERENCE TO RELATED APPLICATION

This application claims priority under 35 U.S.C. §119 to Provisional Patent Application Ser. No. 61/420,693, entitled "METHOD FOR DETERMINING THE QUALITY OF THE END CONSUMER'S EXPERIENCE OF STREAMING MEDIA" filed on Dec. 7, 2010 and claims priority under 35 U.S.C. §119 to Provisional Patent Application Ser. No. 61/440,349, entitled "METHOD FOR DETERMINING THE QUALITY OF THE END CONSUMER'S EXPERIENCE OF STREAMING MEDIA" filed on Feb. 7, 2011. The subject matter of this earlier filed application are hereby incorporated by reference.

TECHNICAL FIELD

This description relates to streaming media.

BACKGROUND

Content streaming is a well-known and popular technique for delivering content over a wired or wireless network, or other transmission medium. For example, providers of audio content (e.g., radio networks) may wish to stream audio content over the public internet. In other examples, providers of video content (e.g., television channels) may similarly wish to stream video content, e.g., also over the public internet, or over a private network (e.g., a corporate intranet).

In these and similar contexts, content streaming generally refers to the technique of playing or otherwise rendering a given portion of a content file, while a subsequent portion of the content file is still in the process of being downloaded or otherwise delivered. In other words, the content file being streamed is progressively downloaded and rendered, until an entirety of the content file has been played or otherwise rendered for consumption thereof by a receiving user. In this way, a consumer of the content file (e.g., a viewer of a video file) may advantageously begin to experience a given content file much sooner than if the consumer were required to download an entirety of the content file before being allowed to proceed with a rendering thereof.

In practice, however, content streaming is subject to a number of difficulties which may mitigate such advantages. For example, if a given content file is transferred to a player at a rate which is slower than a rate required for continuous rendering of the content by the player, then it may become necessary for the player to temporarily pause the rendering of the streamed content, until a sufficient amount of the content has been received to permit resumption of the rendering. Such pauses are known to be inconvenient to consumers, and may cause the consumers to, e.g., stop viewing a particular video, or to select another provider of the video being viewed. As a result, content providers may suffer a loss of viewership, which may be associated with a loss of profitability or numerous other disadvantages.

Therefore, content providers and other entities (e.g., advertisers who pay to include advertisements in conjunction with streamed content) have a vested interest in being able to judge a quality of a consumer's experience of receiving streamed content. However, it may be difficult to determine the quality of the consumer's experience in a reliable, convenient, and efficient manner, and in a manner which is non-intrusive to the consumer of the streamed content.

SUMMARY

According to one general aspect, a computer system may include instructions recorded on a computer-readable medium and executable by at least one processor. The system may include a bit stream analyzer configured to cause the at least one processor to detect a bitstream representing a streamed content file that is being streamed from a streaming server to a client over a network connection. The system may include an encoding rate extractor configured to cause the at least one processor to determine an encoding rate of the bitstream, and a bit rate extractor configured to cause the at least one processor to determine a transfer bit rate at which the bitstream is being streamed. The system may include a pause calculator configured to cause the at least one processor to determine a minimum wait time experienced at the client during which playback of the streamed content file is paused, based on the encoding rate and the transfer bit rate.

According to another general aspect, a computer-implemented method may include detecting a bitstream representing a streamed content file that is being streamed from a streaming server to a client over a network connection. The method may include determining an encoding rate of the bitstream, and determining a transfer bit rate at which the bitstream is being streamed. The method may include determining a minimum wait time experienced at the client during which playback of the streamed content file is paused, based on the encoding rate and the transfer bit rate.

According to another general aspect, a computer program product may be tangibly embodied on a computer-readable medium and may include instructions. When executed, the instructions may be configured to detect a bitstream representing a streamed content file that is being streamed from a streaming server to a client over a network connection. The instructions may be configured to determine an encoding rate of the bitstream, and to determine a transfer bit rate at which the bitstream is being streamed. The instructions may be configured to determine a minimum wait time experienced at the client during which playback of the streamed content file is paused, based on the encoding rate and the transfer bit rate.

The details of one or more implementations are set forth in the accompanying drawings and the description below. Other features will be apparent from the description and drawings, and from the claims.

DETAILED DESCRIPTION

Figure 1:
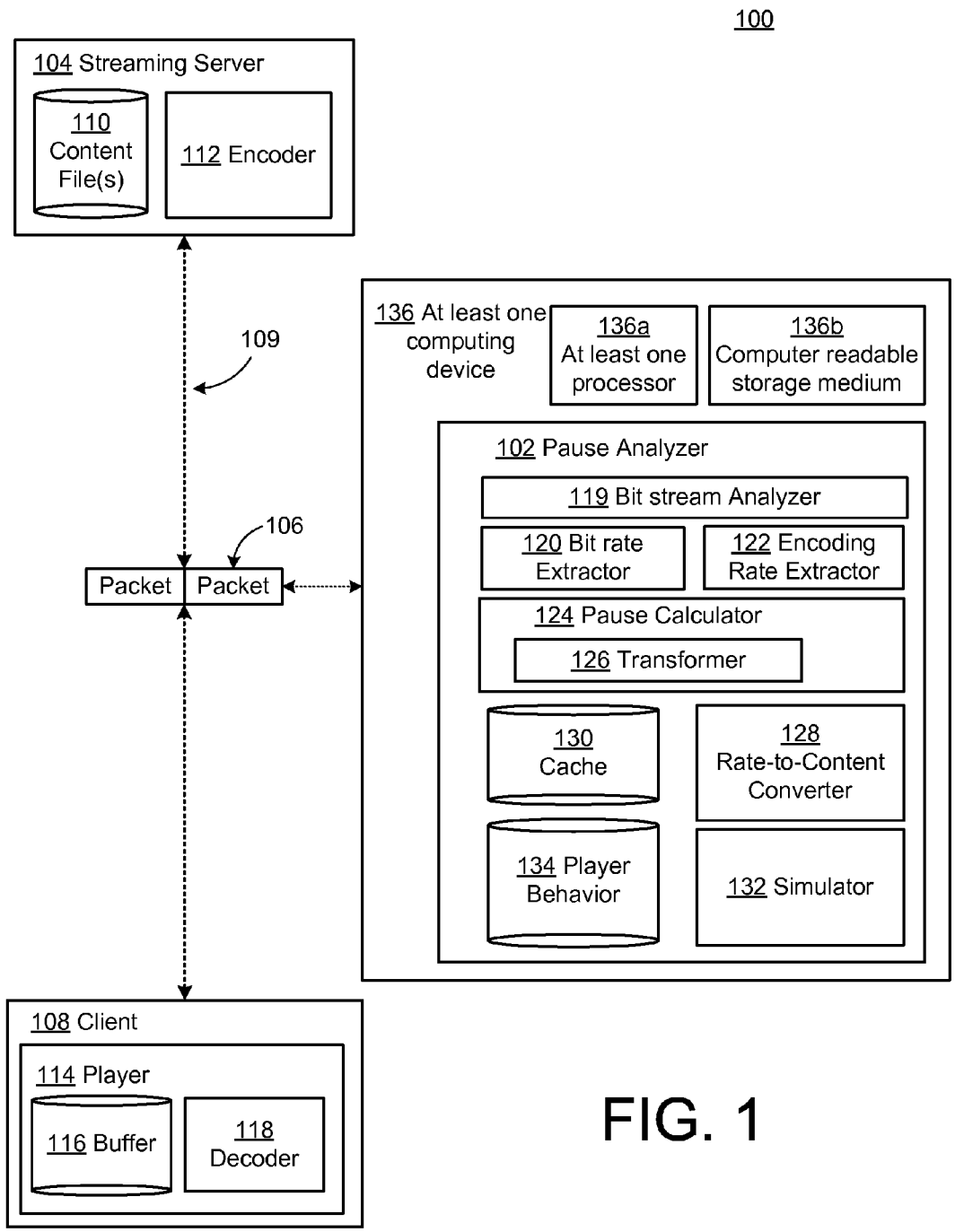
FIG. 1 is a block diagram of a system for determining a quality of a consumer's experience of streaming media.

FIG. 1 is a block diagram of a system 100 for determining a quality of a consumer's experience of streaming media. In the example of FIG. 1, a pause analyzer 102 may be configured to detect an occurrence and duration of a pause in the delivery from a streaming server 104 of a compressed bit stream 106 to a client 108 using a connection 109, so as to thereby quantify an extent of inconvenience or dissatisfaction of a user of the client 108 in experiencing media or other content being streamed by way of the compressed bit stream 106. In this way, an operator of the streaming server 104 and other interested entities may be made aware of the level of dissatisfaction or inconvenience of the user of the client 108, and may therefore take action to respond accordingly in a desired manner.

More specifically, as illustrated in FIG. 1, the streaming server 104 may include or access one or more content files 110 which may be encoded by an encoder 112 for transmission over the connection 109 as the compressed bit stream 106. Thus, the content files 110 may include one or more files which contain audio, video, or any other type or combination of media which may be streamed over the connection 109 to the client 108. Consequently, the encoder 112 may represent one of the many types of well-known techniques for compressing or otherwise preparing the content file(s) 110 for transmission over the connection 109 as the bit stream 106. In particular, as shown, the encoder 112 may encode the content file 110 according to well-known streaming protocols for representation as a plurality of data packets, or packets, within the bit stream 106 for transmission over the connection 109.

Meanwhile, at the client 108, a player 114 may include or be associated with (in addition to other well-known and standard components) a buffer 116 and a decoder 118, both of which may be configured to assist the player 114 in rendering content of the content file 110 as streamed to the player 114 within the compressed bit stream 106. The client 108 and/or the player 114 may include or represent one or more of a variety of associated software applications that are currently available, or that may become available in the future. For example, examples of the player 114 include Windows Media Player, Quicktime, or iTunes. As is well known, the decoder 118 may implement the same codec used by the encoder 112 to encode the content file 110 at the stream server 104, so as to recreate the content at the player 114.

Meanwhile, the buffer 116 may be configured to store a received portion of the compressed bit stream 106, so as to minimize a number of interruptions in a delivery/streaming of the content in order to thereby achieve smooth playback of the content using the player 114, even at the cost of an increased overall time of delivery of the contents. Specific, non-limiting examples of the codec used by the encoder 112 and decoder 118 may include, e.g., MP3, Vorbis, AAC, MPEG, MPEG2, MPEG4, Quicktime, V8, or H.264, while similarly well known and non-limiting examples of streaming protocols used to stream the bit stream 106 may include RTSP (Real Time Streaming Protocol), MMS (Microsoft Media Protocol), or HTTP (HyperText Transfer Protocol) streaming.

As referenced above, and as is well known, the encoder 112 may encode the content file 110 in a manner which translates or corresponds to a real-time play rate of the content, at a given/desired level of resolution (e.g., for a given/desired level of quality of playback). That is, for example, in various implementations, various content files 110 may be associated with varying amounts of data used to represent the content and/or with varying levels of resolution desired by a provider of the streaming server 104 and/or a user of the client 108. For example, in a first implementation, the content file 110 may include a very high resolution video file, while, in a second example implementation, the content file 110 may include only a relatively low resolution audio file. Consequently, it will generally be necessary for the encoder 112 to encode significantly larger amounts of data per unit time in the former example then would be required in the latter example.

Thus, in the context of the present description, the encoder 112 may be understood to utilize a higher encoding rate in the implementation of the former example, as compared to an encoding rate in the implementation of the latter example. Thus, the term encoding rate is generally utilized herein to refer to an amount of data encoded for playback at the player 114 per unit of time, and which, as referenced above, therefore translates or corresponds to a real-time play rate of the content at the player 114.

Meanwhile, a number of factors associated with the system 100 may contribute to an actual transfer rate for the bit stream 106 from the streaming server 104 to the client 108 via the connection 109. For example, as referenced above, the connection 109 may refer to a wired or wireless network connection, including, for example, transmission over the public internet. As is well known, many network factors may influence a transfer/delivery rate of the bit stream 106 in such contexts. For example, such factors may include hardware and/or software malfunctions associated with devices of the network, a capacity of the network or portions thereof relative to a current level of usage of the network or portions thereof, malicious attacks on the streaming server 104 and/or the network, and various other well-known factors. Somewhat similarly, a number of well-known factors which may be associated with the client 108 also may contribute to an actual transfer rate of the bit stream 106. For example, such factors may include a type of hardware/software used to implement the client 108 and the player 114, a current usage level thereof, and various other well-known factors.

In the context of the present description, the term transfer bit rate (or just bit rate) may be used to refer to the just-referenced rate at which the bit stream 106 is effectively transferred from the streaming server 104 to the player 114. As is well known, and as may be appreciated from the above description, an effective bit rate and its context may vary significantly over time, and, specifically, and may vary significantly during a time of streaming of the bit stream 106.

Meanwhile, an encoding rate used by the encoder 112 also may vary over time. For example, the encoding rate may vary in conjunction with fluctuations in a desired or necessary level of encoding associated with various levels of resolution associated with the one or more content files 110. Similarly, the encoding rate 112 may intentionally be raised or lowered (thereby resulting in a corresponding raising or lowering of an ultimate quality of playback of the content file 110 at the player 114), examples of which are described in more detail below.

As may be appreciated from the above description, such variations in the transfer bit rates and encoding rates relative to one another at given points in time may be used to characterize a quality of the streaming of the content file 110, and thus may characterize an experience of a user of the player 114 in experiencing the receipt of the content file. For example, if the transfer bit rate remains equal to or higher than the encoding rate at each point in time during streaming of the content file 110, then an optimal situation exists in which pauses in the streaming of the content file 110 at the player 114 may be minimized or eliminated. However, if, during the streaming of the content file 110, the transfer bit rate is sufficiently slower than the encoding rate for a particular period of time, then delivery may be interrupted for a certain amount of time, so that playback at the player 114 is required to be paused, and the user of the player 114 must therefore wait until playback resumes.

For example, it may occur that a user of the player 114 may begin to download the content file 110 (e.g., a video file). After two minutes of downloading, perhaps only thirty seconds of the video may have been downloaded. Therefore, in this example, the user will have to wait at least 1.5 minutes in order to view the video in its entirety. As may be appreciated, the user may experience this wait time in different ways, depending on the user's preference and/or on characteristics of the player 114. For example, the user may wait the entire 1.5 minutes before beginning to view the video (in which case the video may thereafter be viewed in its entirety), or may begin to view the video as soon as possible, in which case the video will pause one or more times during playback thereof. Moreover, although not explicitly illustrated in FIG. 1, it may be appreciated that the streaming server 104 may stream the content file 110 to a large number of clients simultaneously or in parallel, and the various users thereof may have corresponding different playback experiences. Thus, it may be difficult for the streaming server 104 to be aware of, or to quantify, the manner and extent of such pauses as experienced by a particular user.

Therefore, the pause analyzer 102 may be configured to determine one or more metrics characterizing a nature and extent of such pause times in the delivery of the content file 110. Specifically, as described in detail below, the pause analyzer 102 may be configured to determine an overall minimum pause time (i.e., how long the player 114 pauses while waiting for content to be received/rendered), as well as a number of such pauses that may occur during the delivery of the content file 110. As may be appreciated from the illustration of FIG. 1, and from the description provided herein, the pause analyzer 102 may be implemented separately from one or both of the streaming servers 104 and the client 108. For example, as shown and described, the pause analyzer 102 may be configured to intercept or otherwise detect the bit stream 106 as it is delivered via the connection 109. For example, the pause analyzer 102 may be configured to monitor network traffic on one or more networks represented by the connection 109 and over which the bit stream 106 may be streamed to the player 114.

Consequently, operations of the pause analyzer 102 may be non-intrusive with respect to the operations of the client 108, and therefore may be convenient for a user of the player 114. For example, the user of the player 114 may not be required to download, install, or otherwise maintain or manage the pause analyzer 102 or other software for monitoring the user's experience. The positioning of the pause analyzer 102 as shown and described herein also may be convenient and efficient for a provider of the streaming server 104. For example, as just referenced, the provider of the streaming server 104 may not be required to install or maintain the pause analyzer 102 (e.g., the pause analyzer 102 may be provided by a third party). Moreover, although not specifically illustrated in the example of FIG. 1, but as would be apparent from FIG. 1 and from the following description, the pause analyzer 102, and/or other instances thereof, may be configured to monitor multiple streaming servers associated with one or more providers. Consequently, the pause analyzer 102 may be utilized to compare delivery quality between such separate streaming servers, so that the associated one or more providers may make accurate and timely judgments about a deployment, selection, or other use of the one or more streaming servers 104.

In example operations, the pause analyzer 102 may be configured to implement a bit stream analyzer 119 which may be configured to detect the bit stream 106 and to extract data therefrom (e.g., from packets thereof), which may then be used in various subsequent calculations, as described herein. For example, the bit stream analyzer 119 may be configured to obtain specific quantities of data related to, or characterizing, a bandwidth of the connection 109, and/or related to, or characterizing, the data encoded by the encoder 112.

Thus, a bit rate extractor 120 may be configured to monitor transfer conditions associated with the streaming server 104, the connection 109, and the client 108. Thus, perhaps in conjunction with the bit stream analyzer 119, the bit rate extractor 120 may be enabled to detect and measure and effective transfer rate associated with the transfer of the bit stream 106 during streaming of the content file 110. In this regard, it may be appreciated that although the content file 110 is streamed uni-directionally from the streaming server 104 to the client 108, communications may nonetheless be conducted between the client 108 and the streaming server 104, as well. For example, as is known, the player 114 may be configured to communicate with the streaming server 104 to relay certain information related to the transfer and receipt of the bit stream 106. Thus, although not specifically illustrated in the example of FIG. 1, the bit stream analyzer 119 and/or the bit rate extractor 120 may be configured to monitor such bi-directional communications between the streaming server 104 and the client 108, so as to thereby extract or otherwise determine relevant transfer bit rates over time.

Meanwhile, the encoding rate extractor 122 may be configured to receive or determine relevant data from the bit stream analyzer 119 and to determine a current effective encoding rate thereof. As referenced above, through the use of packet capture techniques to extract relevant encoding rates, the encoding rate extractor 122 may be implemented outside of the streaming server 104 and the client 108.

Further in the example of FIG. 1, a pause calculator 124 is illustrated which may be configured to consume the extracted transfer bit rates and encoding rates, and thereby determine a minimum pause time associated with the streaming of the content file 110. More specifically, in example implementations, the pause calculator 124 may include a transformer 126 which may be configured to implement the Legendre transform to derive or otherwise determine the minimum overall pause time. Specific examples of the use of the Legendre transform, including equations and algorithms associated therewith, are provided below, e.g., with respect to FIGS. 3-5.

Specifically, in the examples provided, it is described that the pause calculator 124, in order to simplify associated calculations, may assume a substantially constant encoding rate as extracted by the encoding rate extractor 122. In some instances, such an assumption may be fairly reflective of a reality of an associated actual transfer of the bit stream 106. In other example implementations, such an assumption may be sufficiently inaccurate to effect accurate calculations of the overall wait time by the pause calculator 124.

In such instances, for example and as described in detail below, a rate-to-content converter 128 may be configured to maintain the encoding rate as linear (e.g., to describe seconds of video played in terms of real-time seconds) and to convert the bits of the transfer bit rate into seconds of video transferred for playing. In other words, for example, rather than representing the transfer bit rate and the encoding rate as quantities of data encoded per unit time, the rate-to-content converter 128 may enable a linear expression of the encoding rate in terms of seconds of content being played, and a corresponding expression of the transfer bit rate in terms of seconds of content transferred for playing.

In some implementations, a number of times that the rate-to-content converter 128 is required to be called for execution thereof may be reduced through the use of a cache 130 which may be used to temporarily store the conversion results of the rate-to-content converter 128. For example, as referenced above, the streaming server 104 may stream the content file 110 to a large number of clients 108, and the cache 130 may be used to leverage operations of the rate-to-content converter 128 in the context of a first streaming operation (client) for use with respect to various other streaming operations/clients. More detailed examples of usages of the rate-to-content converter 128 are provided in detail below, e.g., with respect to FIG. 7.

Thus, the pause calculator 124 may be configured to determine an overall minimum wait time associated with the streaming of the content file 110 to the player 114. However, such an overall wait time may, in practice, be experienced by the user of the player 114 as two or more smaller, intermittent wait times. Thus, such smaller, intermittent, discrete wait times are referred to herein as pause events, and refer to a number of times that the delivery of the content file 110 is paused, i.e., to a number of times that the user of the player 114 is required to wait for resumption of playback of the content 110 at the player 114.

In general, as is well known and as is referenced above, conventional players such as the player 114 may be configured to attempt to minimize playback interruptions, even at a potential cost of increasing an overall playback time, through the use of the buffer 116. An extent to which this trade-off is implemented may vary significantly, depending, for example, on the type and configuration of the player 114. For example, various implementations of the player 114 may vary significantly with respect to, e.g., a size of the buffer 116, and/or a number of times that the buffer 116 is utilized, and/or based on a number, type, or extent of conditions which are designated as triggering use of the buffer 116.

Therefore, the pause analyzer 102 may include a simulator 132 which may access stored player behavior 134 characterizing these and other features of the player 114. Through the use of such stored player behavior 134, the simulator 132 may utilize calculations of the pause calculator 124 related to the overall, minimum wait time, so as to thereby determine an actual number of pause events that may occur during the delivery of the content file 110 to the particular player 114. Meanwhile, the client 108 and/or the player 114 may be associated with, e.g., implemented in conjunction with, a browser or other graphical user interface used to experience network content. For example, such browsers may include, e.g., Internet Explorer, Google Chrome, Mozilla Firefox, Safari, or other known browser types.

Thus, implementations of the pause analyzer 102 may be understood to provide the provider of the streaming server 104 and/or other interested parties with a quantification of an overall, minimum wait time associated with the delivery of the content file 110, as well as a specific, expected number of pause events associated with the overall wait time. Moreover, as described, the pause analyzer 102 may provide such metric(s) without requiring specific hardware or software associated with the streaming server 104 and/or the client 108. Further, the pause analyzer 102 may operate independently of the particular codec used by the encoder 112/decoder 118, and, similarly, may be independent of a particular streaming protocol utilized in a given implementation. Rather, merely through the use of packet capture concepts as described herein, the pause analyzer 102 may determine all required information for calculating the described metric(s), simply by monitoring the connection 109 to analyze individual packets of the bit stream 106.

In the example of FIG. 1, the pause analyzer 102 is illustrated as being implemented using at least one computing device 136, which may be understood to include at least one processor 136a and associated computer readable storage medium 136b. For example, in some implementations, the at least one computing device 136 may be understood to represent one or more general purpose computing devices, which may be configured through the storage of relevant instructions on the computer readable storage medium 126b to implement the pause analyzer 102 through the use of the at least one processor 136a. In other example implementations, the at least one computing device 136 may represent specialized hardware components configured to route and/or monitor network traffic.

In the example of FIG. 1, the pause analyzer 102 is illustrated as including a number of separate components 119-132. However, it may be appreciated that any such component may be implemented using two or more separate components, perhaps executing on separate computing devices. Similarly, but conversely, any two or more of the components illustrated may be implemented using a single component. Additionally, specific additional or alternative components (in particular, standard, well known hardware/software components) may be included in example implementations, even though not explicitly illustrated in the specific example of FIG. 1.

Figure 2:
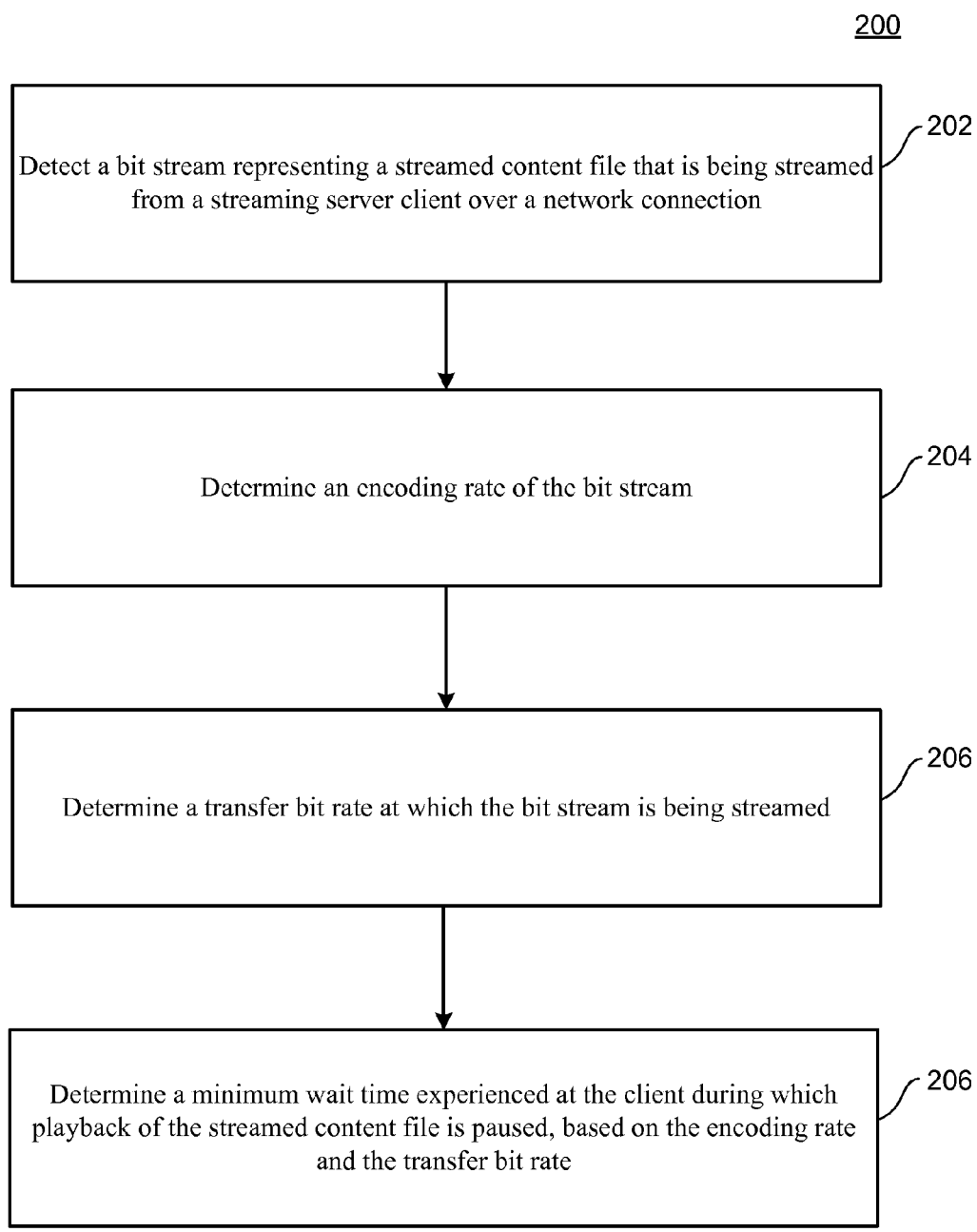
FIG. 2 is a flowchart illustrating example operations of the system of FIG. 1.

FIG. 2 is a flowchart 200 illustrating example operations of the system 100 of FIG. 1. In the example of FIG. 2, operations 202-208 are illustrated as separate, sequential operations. However, it may be appreciated that FIG. 2 provides non-limiting examples of operations of the system 100 of FIG. 1. Consequently, in other implementations, the operations 202-208 may be performed in a different order than that shown, including, for example, in a partially or completely overlapping or parallel manner, and/or in a nested, iterative, or looped fashion. Moreover, additional or alternative steps may be included, and/or one or more of the operations 202-208 may be omitted.

In the example of FIG. 2, a bit stream representing a streamed content file that is being streamed from a streaming server client over a network connection may be detected (202). For example, the bit stream analyzer 119 may be configured to detect the bit stream 106 being streamed from the streaming server 104 to the client 108, to thereby provide the content file 110 for rendering by the player 114.

An encoding rate of the bit stream may be determined (204). For example, the encoding rate extractor 122 may extract one or more relevant encoding rates from individual packets of the bit stream 106, as encoded by the encoder 112, using data provided by the bit stream analyzer 119. The encoding rate may be expressed, represented, or utilized using different formats and/or using different units. For example, the encoding rate may be expressed by the encoding rate extractor 122 in terms of data encoded per unit time, or may be expressed by the encoding rate extractor 122 and/or rate-to-content converted 128 as second of playback time (e.g., seconds of video playback time).

A transfer bit rate at which the bit stream is being streamed may be determined (206). For example, the bit rate extractor 120 may be configured to determine a transfer rate of the bit stream 106, e.g., using data received from the bit stream analyzer 119 and/or based on communications between the streaming server 104 and the client 108, and/or on network conditions associated with the network connection 109.

A minimum wait time experienced at the client during which playback of the streamed content file is paused may be determined, based on the encoding rate and the transfer bit rate (208). For example, the pause calculator 124 may be configured to utilize the transformer 126 to implement the Legendre transform using the extracted encoding rate and bit rate, to thereby determine the minimum wait time experienced by the user of the player 114 during streaming of the content file 110. More particularly, as described in detail below with respect to FIGS. 3-5, the pause calculator 124 may utilize graphical representations (graphs) of the extracted bit rate and encoding rate to implement the Legendre transform and thereby determine the minimum wait time.

Figure 3:
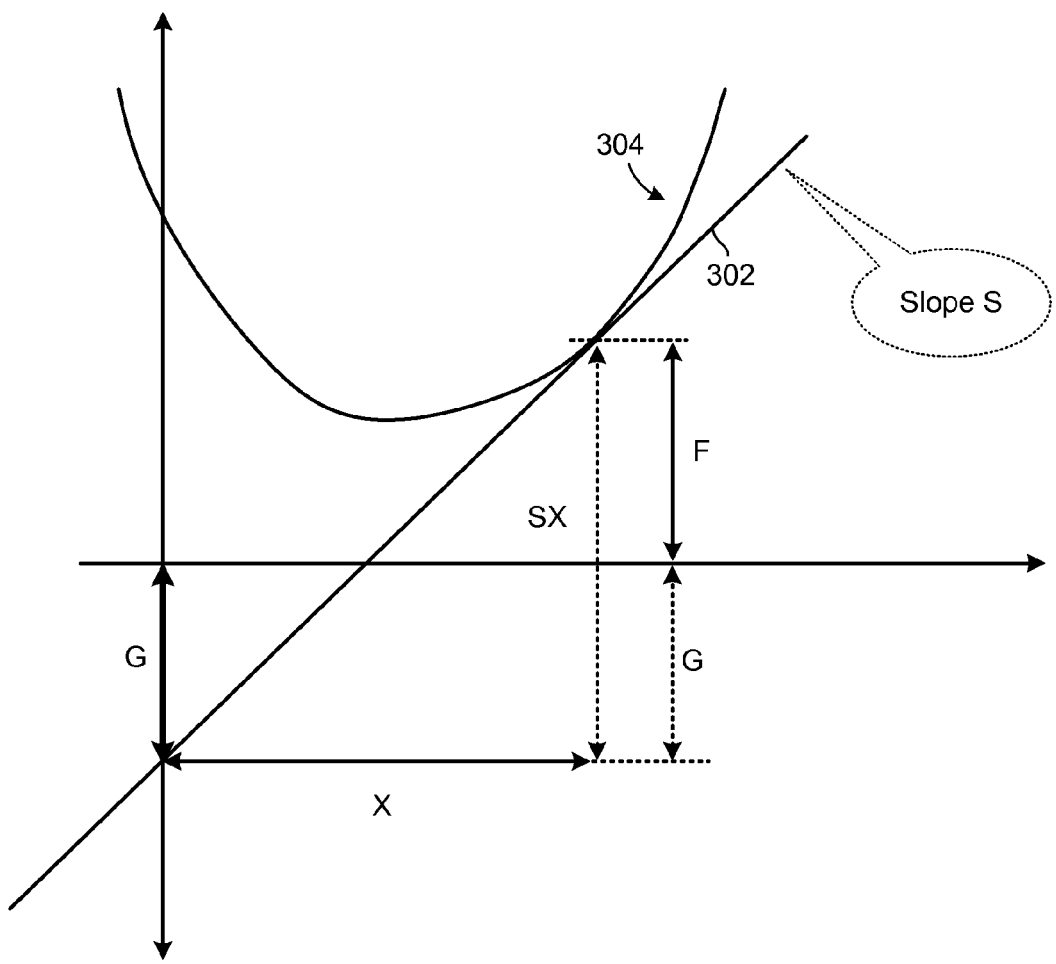
FIG. 3 is a graph illustrating a nature of the Legendre transform.

Specifically, for example, FIG. 3 illustrates a graph demonstrating an example set of characteristics of the Legendre transform. Specifically, the Legendre transform, by itself, is well known to input a particular function and/or graphical representation thereof, and to output a transformed version thereof which includes all the information contained in the original graph/function. In particular, for certain types of convex functions, the Legendre transform thereof may be represented by a family of lines which are a function(s) of the respective slopes thereof, and which are each characterized by an associated Y intercept thereof.

Specifically, the Legendre transform f* of a function f: R → R is defined by:

$$f^*(s) = \sup_x |sx - f(x)| \qquad \text{Equation (1)}$$

Specifically, in the example of FIG. 3, a convex function 304 may be understood to have a Legendre transform thereof which includes a line 302 having a slope s. More specifically, as is well known, the Legendre transform includes all such lines/slopes which are entirely beneath or below the convex function 304 and which intercept the convex function 304 at a single point. This family of lines has corresponding slopes, and thus Y intercepts, which are (assuming that the convex function 304 is differentiable), the derivative of the convex function 304 at the point of interception of the line 302 and the convex function 304. Then, a corresponding Y intercept may be determined which completely characterizes a corresponding line, such as the line 302. Thus, in the example of FIG. 3, as shown, the distance X represents the point at which the line 302 and the function 304 intercept, so that the line 302 has a slope S which is equal to the derivative of the convex function 304 at the point X. Then, the point X is associated with a Y value of Y=F, as shown, and the line 302 is further characterized as having a Y intercept defined by the value G (i.e., −G in the example).

Figure 4A:
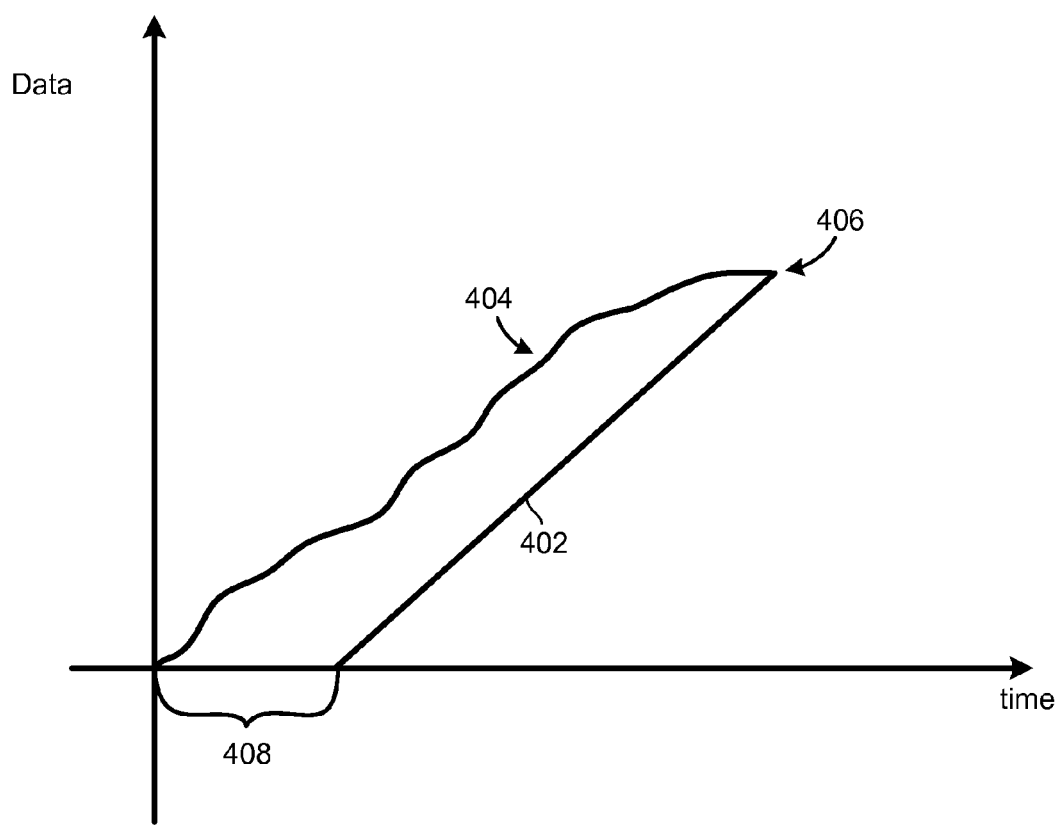
FIG. 4A is a graph illustrating a delivery of streamed content with a constant encoding rate.
Figure 4B:
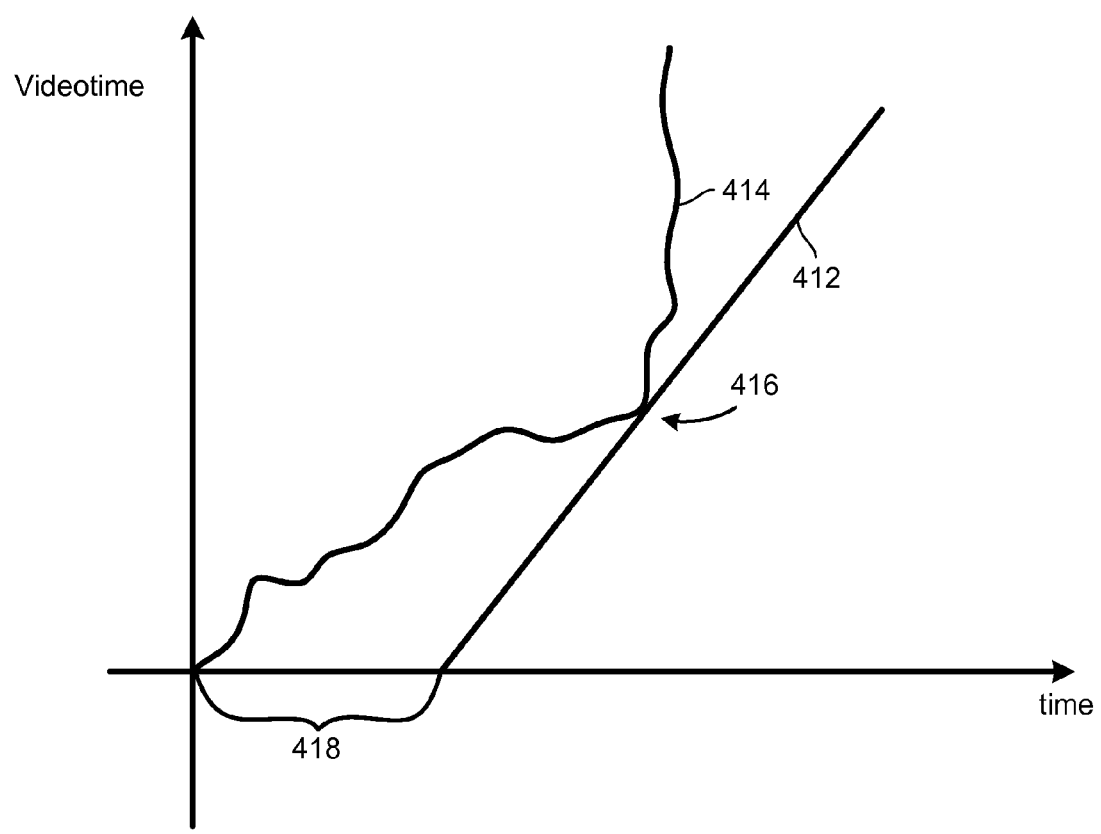
FIG. 4B is a graph illustrating delivery of streamed content with a variable encoding rate.

In FIGS. 4A and 4B, related concepts to the Legendre transform of FIG. 3 are implemented in the context of the system 100 of FIG. 1. Specifically, FIGS. 4A and 4B illustrate, rather than explicit functions, such as the convex function 304, implicit functions represented by, or included in, graphical representations of the relevant bit rates and/or encoding rates. In such cases, the Legendre transform may be implemented directly on the graphical representations, where the graph may be represented as the type (Num a, Ord a)=> [(a, a)]. For example, as referenced above, appropriate coding techniques may be used to implement operations of FIG. 1, and, as a specific example, example code sections are provided below in the Haskell computing language. Thus, the Legendre transform of a discrete function (i.e., Equation (1) above), given its graph, may be written in the Haskell computing language as $$\text{legendre } sb = \text{maximum}[s^*x - y | (x,y) \leftarrow b] \qquad \text{Equation (2)}$$

FIG. 4A illustrates a graph in which a constant (average) encoding rate is assumed, and in which a slope s of the line 402 represents this encoding rate of the encoder 112 in encoding the content file 110. Meanwhile, the graph 404 illustrates an example of the associated transfer bit rate which exists in conjunction with the streaming of the content file 110 within the bit stream 106 (i.e., is expressed as bits downloaded as a function of elapsed real time).

In the simplified example of FIG. 4, the encoding rate represented by the slope s of the line 402, as just referenced, is assumed to be an average rate representing the average number of bits required to encode one second of the content file 110, e.g., one second of video. Then, in the simplified example of FIG. 4A, it may be assumed that the true encoding rate is substantially constant. Then, assuming the determination of the graph 404 representing the transfer bit rate of the bit stream 106, an approximation of the minimum interruption time (t) 408 in seconds may be recognized as the x-intercept of the line 402, i.e., f*(s)/s, which may be written in the Haskell language as $$t = (\text{legendre } sb)/s \qquad \text{Equation (3)}$$

where, again, the slope s in this equation corresponds to the encoding rate as determined by the bit stream analyzer 119 and the encoding rate extractor 122.

The determination of the minimum interruption time t from Equation (3) may be recognized by the fact that the player 114 may consume at most s bits per second and cannot consume bits not yet downloaded. Then, assuming that F is discrete, the line 302 of FIG. 3 or the line 402 of FIG. 4, which as described as less than or equal to the respective graph f(x) 304, 404 for all x but meeting f(x) for some x, may be interpreted as the optimal path of the player 114 and the function 304, 404={(x, f(x))}. Then, the waiting time t is thus the x intercept, which is precisely f*(s)/s.

In the example of FIG. 4A, it may be observed that the line 402 and the graph 404 are thus represented as functions of time representing, e.g., an amount of data transferred per unit of time. Then, in the example of FIG. 4A, at the x-intercept defined by interval 408 represents the minimum wait time required for the user to view the content file 110. In the example of FIG. 4A, for example, it may occur that the user waits a time 408 before beginning viewing of the streaming file, so that the file may thereafter stream continuously until done at point 406.

In another example, in FIG. 4B, a variable encoding rate may be assumed. In such cases in which the encoding rate may vary significantly, a different/better approximation may be obtained by analyzing the actual content of the content file (e.g., video of a video file) 110, using, e.g., the rate-to-content converter 128 of FIG. 1. Then, as referenced above with respect to FIG. 1, the simplicity of constant encoding rate analysis may be retained by keeping the player path linear and transforming the graph of the transfer bit rate from bits downloaded as a function of elapsed real time (as in FIG. 4A), to elapsed video time as a function of elapsed real time, as shown in FIG. 4B.

Then, the example of FIG. 4B illustrates an implementation with a transfer bit rate 414 and an encoding rate represented by a slope s of the line 412, and a point 416 representing a meeting of the graph 414 and the line 412, so that the Legendre transform may be used to determine an associated minimum wait time defined by an x intercept associated with interval 418.

Figure 7:
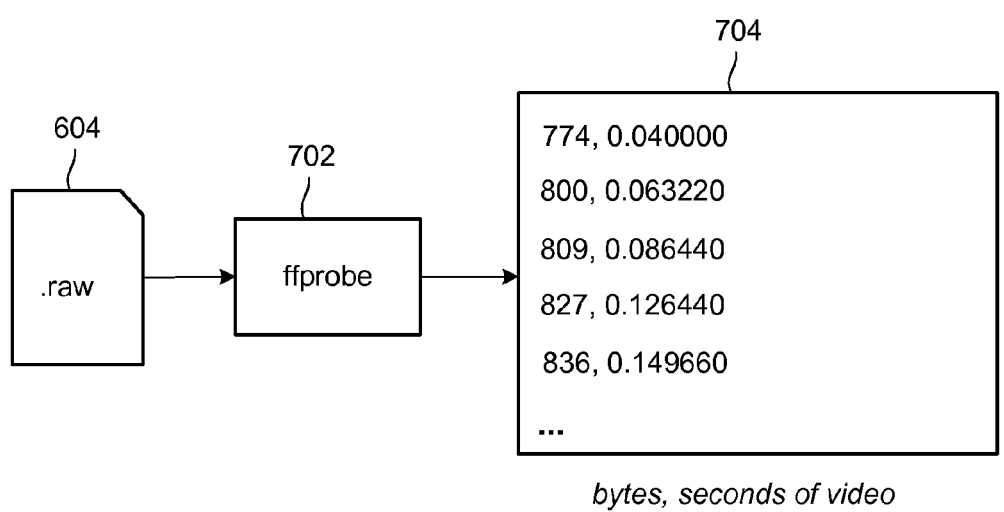
FIG. 7 is a block diagram of an example implementation of FIG. 6.

As referenced above, in such contexts, the rate-to-content converter 128 may thus be considered as implementing a function which converts bits to seconds of video. Then, the transformation of the graph 414 may be implemented using function composition, as shown in Equation (4) as expressed in the Haskell language:

$$b'=\text{map}(\backslash(x,y) \rightarrow (x, \text{ffprobe } y))b \qquad \text{Equation (4)}$$

where, as described in detail below with respect to FIG. 7, ffprobe represents an example function for obtaining a conversion of bits to seconds of video.

Then, the corresponding minimum interruption time t' may be represented in the Haskell language as:

$$t'=\text{legendre } 1b' \qquad \text{Equation (5)}$$

which is analogous to Equation (3) above but with an assumed slope of 1.

As described, an efficient implementation of the rate-to-content converter 128 may utilize the cache 130 and associated caching scheme to avoid calling the rate-to-content converter 128 more often than may be necessary to obtain a desired quality or level of result in predicting the minimum interruption time. In particular, the rate-to-content converter 128 may execute an initial conversion for an encoding rate of the content file 110 during a first streaming thereof to the client 108, and the results of this conversion may be stored using the cache 130 for use in subsequent streaming operations to various other clients/players having users wishing to view the content file 110.

Figure 5:
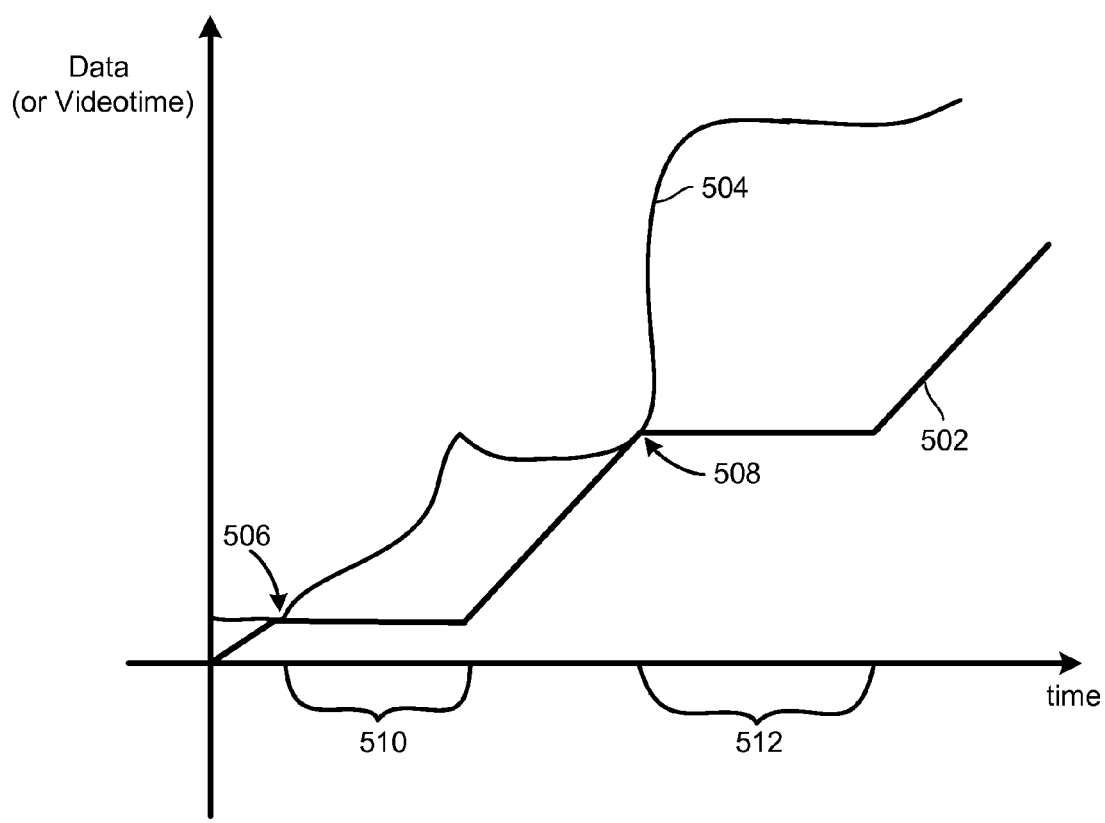
FIG. 5 is a graph illustrating delivery of streamed content with a predictable number of pause events.

As shown with respect to FIG. 5, and as referenced above with respect to the simulator 132 and the player behavior information 134 of FIG. 1, the system 100 may be configured to leverage such knowledge of an individual player 114, including behavior of the player 114 with respect to the buffer 116, so as to obtain an exact solution representing both the overall wait or pause time as well as a specific number of pause events.

Conceptually, such an exact solution may be observed in FIG. 5 by considering the line 502, which, in the example, has a slope(s) corresponding to a relevant encoding rate of the content file 110 being streamed, but which includes segments 510 and 512 which represent time periods during which the buffer 116 buffers the bitstream 106. That is, in the example, the bit stream 106 may immediately begin streaming at time (0, 0), but which then suffers a pause event at point 506 which lasts, as represented by the player behavior 134, for the period 510, at which point the player 114 may resume playing of the bit stream 106 (content file 110). Similarly comments apply to a subsequent time period during which playing continues until a point 508 is reached, at which time the buffer 116 pauses the playing for the time interval 512, after which playing resumes.

As may be observed, FIG. 5 thus represents an example in which a total wait time is observed as the summation of the time intervals 510, 512, and in which a total of two pause events are observed. In additional or alternative embodiments, a similar result may be reached by representing the buffering and associated pause events as causing a shifting of the graph 504 to the left in FIG. 5 (i.e., in a negative time direction with respect to the x axis). That is, an algorithm may be implemented in which the graph 504 is followed starting at the origin, and then on a collision event such as at point 506, the graph 504 is shifted to the left by some amount (e.g., "enough time to download 5 seconds of video"), and then that amount is added to the total wait time and a (or another) pause event is counted. This algorithm may be repeated until the actual total wait time and total number of pause events are determined.

In either case, it may be observed that the minimum wait time described above with respect to FIGS. 4A and 4B may be observed (for the same content file 110 being streamed to the same player 114) to be the same as, or less than, a total wait time experienced by the user in the example of FIG. 5 in which specific player/buffer behavior is simulated. That is, as referenced above, the buffer 116, as is known, may sacrifice a certain amount of wait time in order to provide a smoother viewing experience for the user, and the example of FIG. 5 illustrates techniques for determining a manner and extent to which these goal(s) are obtained, and at what cost in terms of convenience to the user.

Code section 1 illustrates an example algorithm for implementing the just-described behaviors of the simulator 132 in conjunction with the pause calculator 124. Specifically, in the example of code section 1, "buffer" is expected to return a number of packets to buffer upon detection of a collision event.

Code Section 1

```
time _ [ ] = 0
time y b'@(s:sp)
    | y < (snd s) = time (y+(wait 1)) sp
    | otherwise = wait (buffer b') + (time y (drop (buffer b') b'))
    where wait n = (\z → last z − head z) (map fst $ take (n+1) b')
        buffer = ...
```

Then, the exact minimum interruption time t" may be written as $$t''=\text{time } 0b' \qquad \text{Equation (6)}$$

Figure 6:
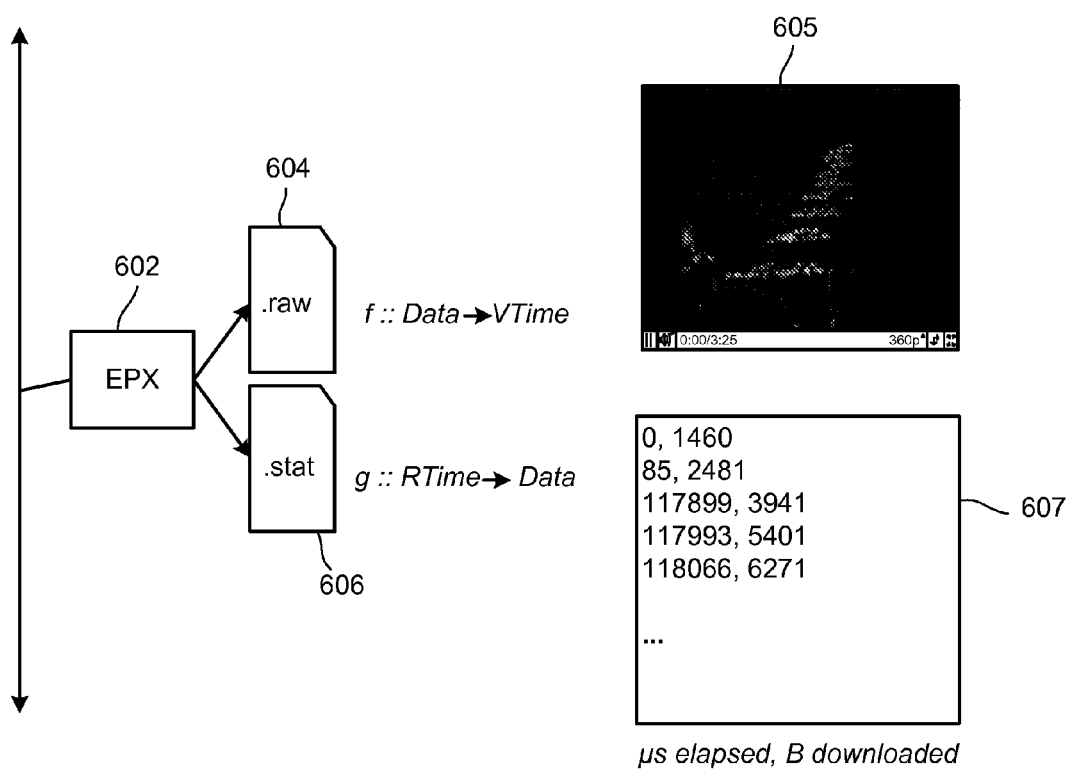
FIG. 6 is a block diagram of an example implementation of a portion of the system of FIG. 1 used to determine data for determining the quality of the consumer's experience of the streamed media.

FIG. 6 is a block diagram illustrating an example implementation of the bit stream analyzer 119 and the extractors 120, 122 of FIG. 1, corresponding to the example above of FIG. 4B. Specifically, as shown, the extractors 120, 122 may be implemented using the EPX function of the True Sight monitoring solution provided by Coradiant, Inc. Specifically, the EPX function 602 may be configured to output a first file illustrated as .raw 604, which may be converted to obtain corresponding amounts of video time shown as video 605. Meanwhile, a file .stat 606 is illustrated as including the data from which the relevant transfer bit rate may be obtained, which is shown in a block 607 as representing the transfer of data as a function of real time by detecting a number of microseconds elapsed during a corresponding download of a detected number of bits. In this way, it may be appreciated that information may be obtained for constructing the graph of FIG. 4B, and similar graphs.

In particular examples, relevant software may be used to facilitate the obtaining of the results of FIG. 6, and/or related results. For example, the software ffprobe, as referenced above in Equation (4), may be utilized to facilitate capture and expression of the encoding rate in conjunction with the .raw file 604 as represented by the video 605 of FIG. 6. Thus, in the example of FIG. 7, an example of the ffprobe software is illustrated as including ffprobe software 702, which, as shown, transforms the .raw file 604, perhaps in conjunction with the encoding rate extractor 122, into data 704 which represents a number of bytes in terms of corresponding seconds of video played by the player 114.

Figure 8:
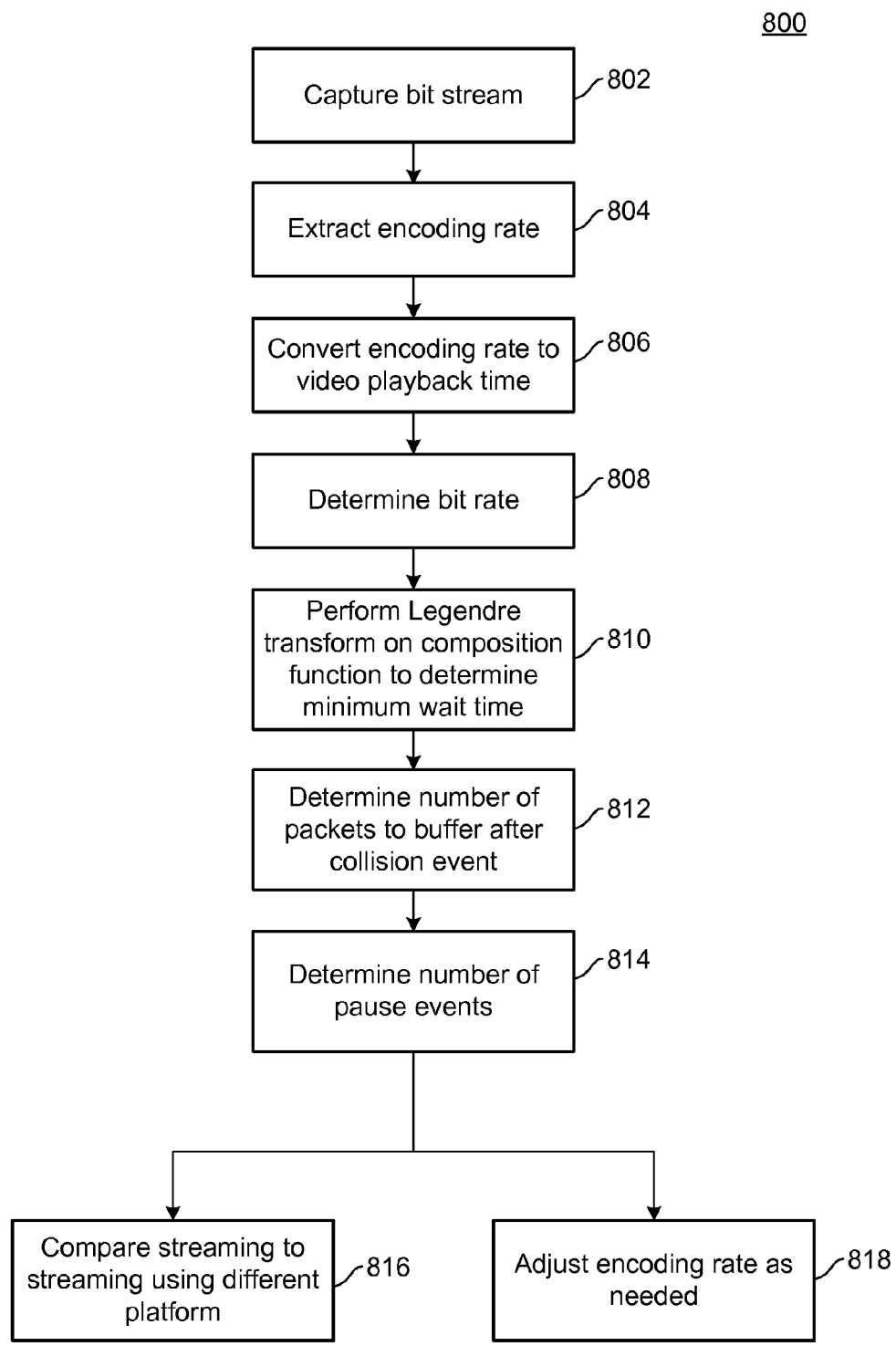
FIG. 8 is a flowchart illustrating more detailed example operations of the systems of FIGS. 1, 6, and 7.

FIG. 8 illustrates a flowchart 800 providing more detailed example implementations of the system 100 of FIG. 1. Specifically, in the example of FIG. 8, the bit stream 106 may be captured or otherwise detected, e.g., by the bit stream detector 119 (802). Thus, the relevant encoding rate or encoding rates associated therewith may be extracted (804), e.g., by the encoding rate extractor 122. In the example of FIG. 8, the encoding rate may thereafter be converted to seconds of video playback time (806), e.g., by the rate-to-content converter 128 as just described with respect to element 702 of FIG. 7. In conjunction therewith, the transfer bit rate of the bit stream 106 may be determined (808), e.g., using the bit rate extractor 120.

Subsequently, a Legendre transform may be performed on the composition function representing the converted extracted encoding rate relevant to the graph representing the detected transfer bit rate, so as to thereby determine a corresponding minimum wait time (810). For example, the transformer 126 of the pause calculator 124 may perform such calculations according to the above description of FIGS. 3-5.

A simulator 132, in additional or alternative operations to those just described, may utilize the player behavior 134 with respect to the specific player 114, so as to determine a number of packets to buffer after a collision event of the graph representing the transfer bit rate with the line representing the converted encoding rate/video playback time (812). In this way, as described above with respect to Code Section 1 and Equation (6), the simulator 132 may determine a corresponding number of pause events (814), in conjunction with a correspondingly-adjusted/calculated total wait time which takes into account the behavior of the player 114 with respect to the buffer 116, as recorded within the player behavior 134.

Utilizing such information, a provider or operator of the streaming server 104 and/or other streaming servers (or other interested parties), may compare the existing streaming of the content file 110 relative to the corresponding streaming thereof which may occur using a different platform (816). For example, a provider may utilize two separate such streaming servers, and may wish to decide between the two for providing the content file 110. In other examples, the provider of the streaming server may determine that the minimum wait time and associated pause events in delivering the content file 110 may be unacceptable, and may wish to convert to a substantially different platform for streaming media, such as, e.g., a content delivery network (CDN).

In additional or alternative examples, it may be possible to adjust the encoding rate of the encoder 112 as needed or desired (818). For example, as is well known and as is referenced above, an ability of the connection 109 and the player 114 to render the bit stream 106 representing the content file 110 with minimal or no pauses are heavily dependent on an amount of data in the content files 110 that is actually encoded by the encoder 112 for delivery by the bit stream 106. That is, when the encoder 112 encodes a relatively large amount of data within each second or packet of the bit stream 106, higher transfer rates associated with the connection 109 and the player 114 may be required to provide minimal or no interruptions in the delivery thereof. On the other hand, when the encoder 112 encodes relatively smaller amounts of data within each second or packet, then lower transfer rates may be acceptable.

Thus, during an example implementation of the system 100 of FIG. 1, it may occur that feedback is provided between the pause analyzer 102 and the encoder 112, so that the encoder 112 may be configured to utilize smaller encoding rates in response to a determination of an unacceptable amount of wait times and/or pause events. In this way, the user of the player 114 may be enabled to experience fewer interruptions and smoother playback of the content file 110, albeit at a lower resolution and decreased quality of playback.

Although the present description describes a number of example implementations, it may be appreciated that these are non-limiting examples, and that additional or alternative implementations or features thereof are contemplated, as well. For example, although not specifically illustrated or described above, the system 100 may include one or more graphical user interface(s) (GUI(s)). For example, such GUIs may be used to view the types of graphs shown in FIGS. 4A, 4B, and 5, and/or to provide operators of the system 100 to designate/select the streaming server 104, to configure elements of the pause analyzer 102 (e.g., to configure the player behavior 134), or to otherwise utilize the pause analyzer 102.

Further, implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium) for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A computer system including instructions recorded on a non-transitory computer-readable medium and executable by at least one processor, the system comprising:
   a bit stream analyzer configured to cause the at least one processor to detect a bitstream representing a streamed content file that is being streamed from a streaming server to a client over a network connection;
   an encoding rate extractor configured to cause the at least one processor to determine an encoding rate of the bitstream;
   a bit rate extractor configured to cause the at least one processor to determine a transfer bit rate at which the bitstream is being streamed; and
   a pause calculator configured to cause the at least one processor to determine a minimum wait time experienced at the client based on a Legendre transform of a graph based on bits downloaded as a function of elapsed real time, the minimum wait time being experienced during a playback of the streamed content file during which the streamed content file is paused, the minimum wait time being based on the encoding rate and the transfer bit rate.

2. The system of claim 1, wherein the system is external to the client and the streaming server.

3. The system of claim 1, wherein the bit stream includes data packets and wherein the encoding rate extractor is configured to determine the encoding rate based on data extracted from the packets.

4. The system of claim 1, wherein the streaming server and the client are in communication with one another and wherein the bit rate extractor is configured to calculate the transfer bit rate at least partially based on the communication.

5. The system of claim 1, wherein the bit rate extractor and the encoding rate extractor are configured, respectively, to
   to represent the transfer bit rate such that the graph provides bits downloaded as a function of elapsed real time, and
   to represent the encoding rate as a slope of a line intersecting the graph.

6. The system of claim 5, wherein the pause calculator is configured to calculate the minimum wait time using a Legendre transform of the graph, relative to the slope of the line.

7. The system of claim 5, comprising a rate-to-content converter configured to express the encoding rate as a linear function and to transform the representation of transfer bit rate on the graph from bits downloaded as a function of elapsed real time to elapsed video time as a function of elapsed real time.

8. The system of claim 1, comprising a simulator configured to determine behavior of a buffer associated with the client and to simulate streaming of the bit stream to the client based thereon.

9. The system of claim 8, wherein the bit rate extractor and the encoding rate extractor are configured, respectively,
   to represent the transfer bit rate such that the graph is a function of time, and
   to represent the encoding rate as a slope of a line intersecting the graph, and wherein
   the simulator is configured to determine a number of pause events associated with the streaming, based on the graph, the slope, and the buffer behavior.

10. A computer-implemented method, comprising:
    detecting a bitstream representing a streamed content file that is being streamed from a streaming server to a client over a network connection;
    determining an encoding rate of the bitstream;
    determining a transfer bit rate at which the bitstream is being streamed; and
    determining a minimum wait time experienced at the client based on a Legendre transform of a graph based on bits downloaded as a function of elapsed real time, the minimum wait time being experienced during a playback of the streamed content file during which the streamed content file is paused, the minimum wait time being based on the encoding rate and the transfer bit rate.

11. The method of claim 10, wherein
    the graph represents transfer bit rate as bits downloaded as a function of elapsed real time and,
    the encoding rate is represented as a slope of a line intersecting the graph.

12. The method of claim 10, wherein
    the encoding rate is expressed as a linear function, and
    the representation of transfer bit rate on the graph is converted from bits downloaded as a function of elapsed real time to elapsed video time as a function of elapsed real time.

13. A computer program product, the computer program product being tangibly embodied on a non-transitory computer-readable medium and comprising instructions that, when executed, are configured to:
    detect a bitstream representing a streamed content file that is being streamed from a streaming server to a client over a network connection;
    determine an encoding rate of the bitstream;
    determine a transfer bit rate at which the bitstream is being streamed; and
    determine a minimum wait time experienced at the client based on a Legendre transform of a graph based on bits downloaded as a function of elapsed real time, the minimum wait time being experienced during a playback of the streamed content file during which the streamed content file is paused, the minimum wait time being based on the encoding rate and the transfer bit rate.

14. The computer program product of claim 13, wherein the graph represents transfer bit rate as bits downloaded as a function of elapsed real time, and
the encoding rate is represented as a slope of a line intersecting the graph.

15. The computer program product of claim 13, wherein the encoding rate is expressed as a linear function, and
the representation of transfer bit rate on the graph is converted from bits downloaded as a function of elapsed real time to elapsed video time as a function of elapsed real time.

16. The computer program product of claim 13, wherein behavior of a buffer associated with the client is used to simulate streaming of the bit stream to the client to thereby determine a number of pause events associated with the streaming.

17. The computer program product of claim 16, wherein a total wait time equal to or greater than the minimum wait time is determined as a summation of the pause events.

\* \* \* \* \*

UNITED STATES PATENT AND TRADEMARK OFFICE
CERTIFICATE OF CORRECTION

PATENT NO. : 8,706,895 B2  
APPLICATION NO. : 13/174725  
DATED : April 22, 2014  
INVENTOR(S) : Sebastien Marc Peter Zany et al.

Page 1 of 1

It is certified that error appears in the above-identified patent and that said Letters Patent is hereby corrected as shown below:

In the Claims

Column 16, line 1, claim 5, before "represent" delete "to".

Signed and Sealed this  
Eighth Day of July, 2014

Michelle K. Lee  
*Deputy Director of the United States Patent and Trademark Office*